United States Patent [19]

Sliwkowski

[11] 3,746,446

[45] July 17, 1973

[54] EXPOSURE CONTROL SYSTEM AND METHOD FOR PHOTOPLOTTERS

[75] Inventor: Joseph J. Sliwkowski, Framingham, Mass.

[73] Assignee: Computervision Corporation, Burlington, Mass.

[22] Filed: May 5, 1971

[21] Appl. No.: 140,350

[52] U.S. Cl. .................... 355/68, 95/1 R, 95/4.5 R, 355/69

[51] Int. Cl. .................... G03b 27/78

[58] Field of Search .................... 355/67, 68, 69, 71; 95/1 R, 12, 10 CT, 4.5 R

[56] References Cited

UNITED STATES PATENTS

| | | | |
|---|---|---|---|
| 3,617,125 | 11/1971 | Sobottke | 95/4.5 R |
| 3,650,624 | 3/1972 | Yamada | 355/69 |
| 3,524,394 | 8/1970 | Sunners | 95/12 |
| 3,610,119 | 10/1971 | Gerber et al. | 95/1 R |

FOREIGN PATENTS OR APPLICATIONS

| | | | |
|---|---|---|---|
| 4,225,208 | 12/1966 | Japan | 95/10 CT |

*Primary Examiner*—Samuel S. Matthews
*Assistant Examiner*—Russell E. Adams, Jr.
*Attorney*—Chittick, Pfund, Birch, Samuels & Gauthier

[57] ABSTRACT

A velocity independent exposure control system and method for photoplotters which uses exposure feedback to control the ON-OFF cycle of a light source. A photodetector produces a voltage that is proportional to the amount of light impinging upon a photosensitive plotting surface. The photodetector output is integrated by a resettable integrator and the output of the integrator is used as one input to a voltage comparator. The other input to the comparator is a preselected, variable voltage which represents the desired exposure. When the integrated photodetector output voltage equals the reference voltage, the comparator produces an equality signal. A light source control circuit that is responsive to the comparator equality signal then turns the light source off.

4 Claims, 3 Drawing Figures

INVENTOR.
JOSEPH J. SLIWKOWSKI

EXPOSURE CONTROL SYSTEM AND METHOD FOR PHOTOPLOTTERS

BACKGROUND OF THE INVENTION

This invention relates to exposure control systems and methods in general, and more particularly, to an exposure control system and method for photoplotters.

In recent years, photoplotters have been used to generate printed circuit board negatives under computer control. One representative example of such a photoplotter is described in the U.S. Letters Pat. No. 3,330,182, issued July 11, 1967 to H.J. Gerber, et al. for DEVICE FOR EXPOSING DISCRETE PORTIONS OF A PHOTOSENSITIVE SURFACE TO A VARIABLE INTENSITY LIGHT BEAM. The Gerber device employs an X-Y axis moveable optical head which contains a light source and an optical system for projecting a continuous light spot or beam of light upon a photosensitive surface. Suitable means are provided in the Gerber photoplotter for varying the intensity of the light spot or beam in porportion to the speed of the movement of the spot or beam with respect to the photosensitive material. According to the Gerber patent, the intensity-velocity compensation is necessary in order to assure proper or uniform exposure when drawing a line on the photosensitive film.

Other types of photoplotters utilize a step-and-flash technique in which light rays are projected momentarily and progressively onto a sensitized photographic plate to form a preselected pattern. Typical examples of such photoplotters are found in U.S. Letters Pat. Nos. 3,072,014, issued Jan. 8, 1963 to G.O. Rawstron for PHOTOGRAPHIC APPARATUS FOR PRODUCING CURVE LINE; U.S. Pat. No. 3,106,880 issued Oct. 15, 1963 to L. Rossetto, et al. for TYPOGRAPHICAL PHOTO COMPOSING MACHINE; U.S. Pat. No. 3,247,761 issued Apr. 26, 1966 to R.A. Herreman, et al. for PRODUCTION OF PRINTED CIRCUIT BOARDS AND THE LIKE; and U.S. Pat. N. 3,464,330 issued Sept. 2, 1969 to E.V. Lewis for OPTICAL WRITING DEVICE.

The Lewis patent describes a digital plotter utilizing a segmented electroluminescent panel and a tapered fiber optic bundle to transmit a predetermined light image onto a photosensitive surface. Means for regulating the beam intensity are provided in the Lewis optical writing device to achieve uniform exposure even though the speed of travel of the light beam with respect to the recording medium varies over a range of writing speeds. The beam intensity is adjusted by varying the luminous intensity of the electroluminescent panel in accordance with the relative velocity between the light beam and the photosensitive surface. A frequency-to-voltage convertor is employed to produce an excitation voltage for the electroluminescent panel which is proportional to the step command rate for the digitally driven plotter step motors. When the step command rate increases, the amplitude of the excitation voltage increases proportionally producing a concommitant increase in the luminous intensity of the E.L. panel.

The Gerber and Lewis photoplotting devices both use an intensity control system in which the intensity of the light source is modified by a signal proportional to the linear velocity of the light beam with respect to the photosensitive medium.

It is a general object of the present invention to provide an exposure control system for photoplotters which does not require a velocity signal correction of light source intensity, but only a signal that is porportional to the desired exposure on the photosensitive medium.

It is a specific object of the present invention to provide an exposure control system that is independent of the velocity of the light beam with respect to the photosensitive surface.

It is still another object of the present invention to provide an exposure control system for digitally driven photoplotters.

It is a feature of the present invention that the exposure control system utilizes continuous exposure feedback during each incremental movement between the light beam and the photosensitive medium.

SUMMARY OF THE INVENTION

The exposure control system utilizes continuous exposure feedback to control the ON-OFF cycle of a light source. Photodetector means generate a voltage which is proportional to the amount of light impinging upon the photosensitive medium. The photodetector output voltage is integrated in a resettable integrator and the integrator output is then compared to a predetermined reference voltage. When the integrated photodetector output voltage reaches the reference voltage, the light source is turned off. By varying the reference voltage, the total exposure can be adjusted to any desired value within the constraints of lamp intensity and available time between steps of the stepping motor.

DETAILED DESCRIPTION OF THE INVENTION

The objects and features of the present invention will best be understood from a detailed description of a preferred embodiment thereof, selected for purposes of illustration, and shown in the accompanying drawings, in which.

Figure 1:
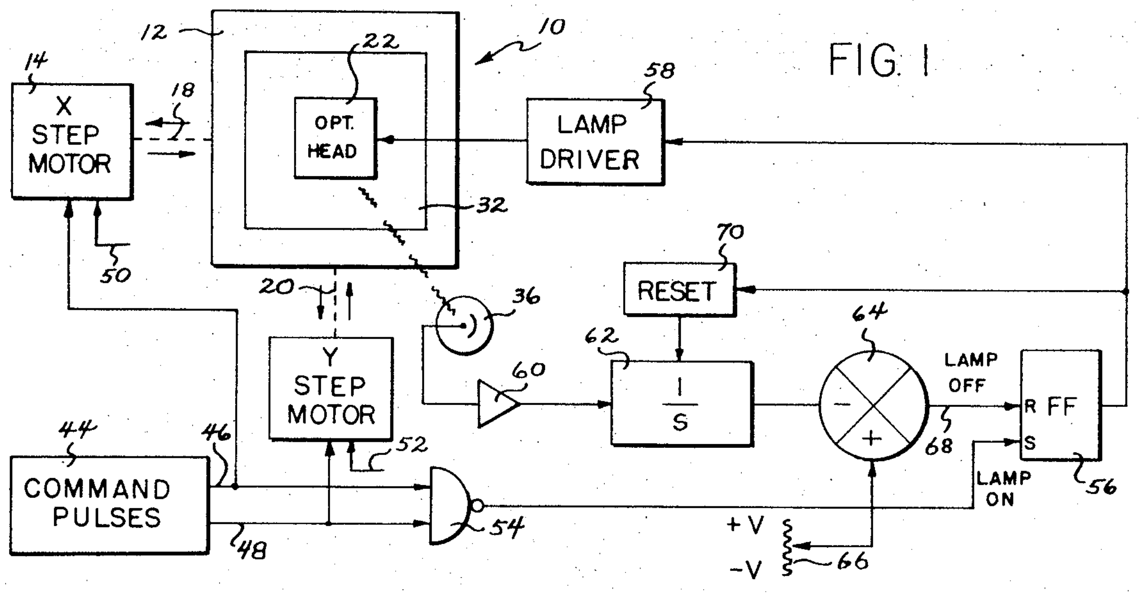
FIG. 1 is a diagrammatic view in partial block form of a photoplotter incorporating the exposure control system of the present invention.

Turning now to the drawings, there is shown a photoplotter indicated generally by the reference numeral 10, which incorporates the exposure control system and method of the present invention. The photoplotter 10 comprises a digitally driven plotting table or plotting surface 12 that is driven in translational movement by X and Y axes stepping motors 14 and 16, respectively, through appropriate gearing indicated representationally in FIG. 1 by the dashed lines 18 and 20.

Positioned above the plotting table 12 is an optical head 22 containing an electrically actuated light source 24, an aperture wheel 26 having at least one light aperture 28, an optical system 30 for projecting an image of the light aperture 28 upon a photosensitive medium e.g., film 32, located on the movable table 12, a beam splitter 34 and a photodetector 36. The photodetector 36 is mounted within the optical head so that a portion of the light from beam splitter 34 will impinge upon the photosensitive element (not shown) of the photodetector. The output voltage from photodetector 36 will therefore represent the instantaneous amount of light impinging upon the photosensitive medium 32.

It will be understood that other structural configurations for the photodetector can be employed to obtain an electrical signal having a characteristic which represents the amount of light falling upon the film 32. For example, the photodetector can be mounted to intercept the light reflected from the film 32 during exposure thereof.

Figure 2:
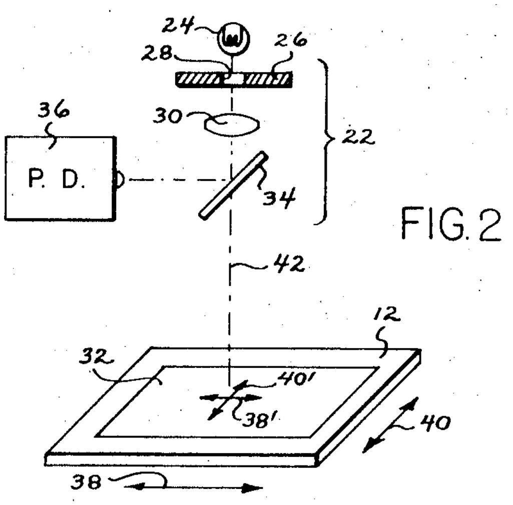
FIG. 2 is another diagrammatic view illustrating the main components of the photoplotter optical head and the physical relationship of the plotting table and photosensitive medium with respect to the optical head; and, FIGS. 3A through 3D are waveform diagrams which depict the waveforms for the command pulses, motor pulses, lamp ON-OFF cycle and the integrator voltages for two preset exposures.

Looking specifically at FIG. 2, the motion of plotting table 12 along the X and Y axes is indicated by the motion arrows 38 and 40, respectively. The corresponding relative movement of the light beam 42 upon the film surface 32 is shown by the corresponding motion arrows 38' and 40'. It will be appreciated that the relative movement of the light beam 42 with respect to the photosensitive medium 32 can be achieved in a number of ways, such as, by moving the plotting table 12 as shown in the illustrative example of FIGS. 1 and 2, or by moving the optical head 22 itself with respect to the plotting table-film combination 12 and 32, respectively, or by moving both the light beam 42 and the plotting table-film combination. The exposure control system of the present invention is suitable for use with all three types of drive systems for the light beam and photosensitive medium. However, for purposes of illustration only, the following description will be limited to the digitally driven plotting table-fixed optical head configuration.

Figure 3:
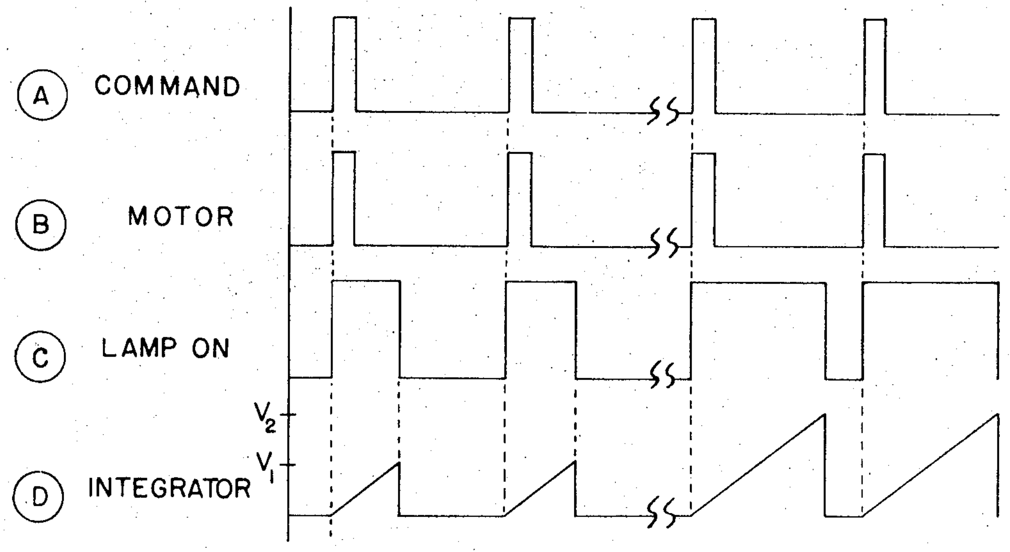

The timing synchronization and control of the photoplotter 10 is provided by command pulses from a command pulse generator 44. The command pulses, as shown in waveform A of FIG. 3, control the actuation time of the digitally driven step motors 14 and 16. A command pulse on pulse generator output line 46 actuates the X-step motor 14. Correspondingly, a command pulse on output line 48 actuates the Y-step motor 16. Waveform B of FIG. 3 illustrates the corresponding motor pulses for X and Y step motors. The direction of stepping is determined by program signals on X and Y step motor input leads 50 and 52, respectively. The program signals can be obtained from a variety of conventional sources including a computer or punched tape (not shown).

The X and Y step motor command pulses on output lines 46 and 48 are applied to an OR gate 54 which in turn is connected to the Set input of a flip-flop 56. If flip-flop 56 is in the Set condition, lamp driver 58 energizes the light source lamp 24. By looking at Waveforms A through C in FIG. 3, it can be seen that the photoplotter lamp 24 is turned on for each increment of X and Y movement of the plotting table 12.

With lamp 24 turned on, an image of the light aperture 28 is projected by the optical system 30 down through beam splitter 34 and onto the film 32. The amount of light impinging upon the surface of film 32 is measured by photodetector 36 which generates an output voltage that is proportional to the amount of such light. If desired, the output voltage of the photodetector 36 can be amplified by an amplifier 60 before integrating the photodetector output voltage in integrator 62. The output from integrator 62 is applied as one input to a voltage comparator 64. The other input to comparator 64 is an adjustable voltage obtained from a voltage source 66. When the integrated photodetector output voltage reaches the level of the reference voltage from source 66, the comparator 64 produces a comparator equality signal on line 68 which resets the flip-flop 56. The resetting of flip-flop 56 turns off the light source 24 through lamp driver 58 and at the same time actuates a reset circuit 70 which discharges the integrator 62.

Since the lamp 24 is turned on for each increment of the plotting table motion, the amount of light falling on the film 32 is independent of the film's relative motion with respect to the light beam 42 from essentially O in/sec up to a predetermined V in/sec. At the velocity V in/sec., the time during which the light is impinging upon the film is insufficient to complete the desired exposure. Thus, within the range of O-V in/sec. the exposure is independent of the relative velocity between the film 32 and the light beam 42.

Although the preceding description has been directed to an embodiment in which the desired exposure is controlled by turning a light source 24 ON and OFF, it will be appreciated that the same results can be achieved by using a shutter mechanism (not shown) to initiate and terminate the light exposure of the film. In this situation, the output signal from flip-flop 56 is used to control the shutter mechanism.

It will also be appreciated that the basic exposure control system and method of the present invention can be employed in other types of photographic machines besides photoplotters. For instance, exposure control is required in contact printers, enlargers, automatic photofinishing machines and the like. In each of these instances, the exposure feedback control system of the present invention can be used to produce the desired light exposure.

Having described in detail a preferred embodiment of my invention, it will now be apparent to those skilled in the art that numerous modifications can be made without departing from the scope of the invention as defined in the appended claims.

What I claim and desire to secure by Letters Patent of the United States is:

1. In a photoplotter having a light source, a light aperture, an optical system for imaging the light aperture on a photosensitive plotting surface and means for producing incremental relative movement between the image of the light aperture and the photosensitive surface, an exposure control system comprising:

1. means for repetitively actuating said incremental relative movement producing means;
2. means for initiating a plurality of incremental light exposures of said photosensitive plotting surface in synchronization with the repetitive actuation of said incremental relative movement producing means;
3. means for producing an output voltage which is proportional to the amount of light impinging upon said photosensitive plotting surface during each incremental light exposure;
4. integrator means coupled to said output voltage producing means for integrating the output voltage thereof;
5. comparator means coupled to said integrator means for comparing the integrated output voltage with a predetermined reference voltage, said comparator means producing a comparator signal when the integrated output voltage and the reference voltage are equal;

6. means responsive to said comparator signal for terminating each incremental light exposure to said photosensitive plotting surface prior to the next actuation of said incremental relative movement producing means; and
7. means responsive to said comparator signal for resetting said integrator means prior to the initiation of the next incremental light exposure.

2. A method for controlling incremental light exposures to a photosensitive surface which is incrementally moved relative to a light formed image thereon, comprising the steps of:

1. initiating the incremental relative movement of said photosensitive surface;
2. initiating an incremental light exposure of said photosensitive surface by said light formed image in synchronization with the initiation of said relative incremental movement of the photosensitive surface;
3. producing an output signal having a characteristic which represents the amount of light impinging upon said photosensitive surface;
4. integrating said output signal;
5. terminating the incremental light exposure to said photosensitive surface when the integrated output signal reaches a predetermine value which represents the desired incremental exposure; and
6. repeating steps (1) –(5) at least once.

3. A method for controlling incremental light exposures to a photosensitive surface which is incrementally moved relative to a light formed image thereon, comprising the steps of:

1. initiating the incremental movement of said photosensitive surface;
2. initiating an incremental light exposure of said photosensitive surface by said light formed image in synchronization with the initiation of said relative incremental movement of the photosensitive surface;
3. generating a voltage which is proportioned to the amount of light impinging upon said photosensitive surface;
4. integrating said voltage;
5. terminating the incremental light exposure to said photosensitive surface when the integrated voltage reaches a predetermined value which represents the desired incremental exposure; and
6. repeating steps (1) –(5) at least once.

4. In a photoplotter having a light source, a light aperture, an optical system for imaging the light aperture on a photosensitive plotting surface and means for producing incremental relative movement between the image of the light aperture and the photosensitive surface, an exposure control system comprising:

1. means for repetitively actuating said incremental relative movement producing means;
2. means for initiating a plurality of incremental light exposures of said photosensitive plotting surface in synchronization with the repetitive actuation of said incremental relative movement producing means;
3. means for producing an output signal having a characteristic which represents the amount of light impinging upon said photosensitive plotting surface during each incremental light exposure;
4. integrator means for integrating said output signal;
5. comparator means for producing a comparator signal when the integrated output signal reaches a predetermined value representing the desired incremental light exposure;
6. means responsive to said comparator signal for terminating each incremental light exposure to said photosensitive plotting surface prior to the next actuation of said incremental relative movement producing means; and
7. means responsive to said comparator signal for resetting said integrator means prior to the initiation of the next incremental light exposure.

* * * * *